US010337451B2

(12) United States Patent
Higasa

(10) Patent No.: US 10,337,451 B2
(45) Date of Patent: Jul. 2, 2019

(54) PISTON FOR INTERNAL COMBUSTION ENGINE

(71) Applicant: HITACHI AUTOMOTIVE SYSTEMS, LTD., Hitachinaka-shi, Ibaraki (JP)

(72) Inventor: Yuto Higasa, Hadano (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 5 days.

(21) Appl. No.: 15/637,655

(22) Filed: Jun. 29, 2017

(65) Prior Publication Data

US 2018/0017014 A1 Jan. 18, 2018

(30) Foreign Application Priority Data

Jul. 12, 2016 (JP) ................................ 2016-137200

(51) Int. Cl.
*F16J 1/04* (2006.01)
*F02F 3/28* (2006.01)
*F02F 3/00* (2006.01)

(52) U.S. Cl.
CPC .............. *F02F 3/28* (2013.01); *F02F 3/0076* (2013.01)

(58) Field of Classification Search
CPC .. F02F 2003/0007; F02F 3/0076; F16J 1/001; F16J 1/16
USPC .......................................................... 92/239
See application file for complete search history.

(56) References Cited

U.S. PATENT DOCUMENTS 3,173,345 A * 3/1965 Thompson ............ F02F 3/0076 92/239
4,274,372 A * 6/1981 Kelm ........................ F02F 3/02 92/239
8,701,619 B2 * 4/2014 Iwata ........................ F02F 3/02 92/239

FOREIGN PATENT DOCUMENTS

JP 2003-269246 A 9/2003

* cited by examiner

*Primary Examiner* — Michael Leslie
(74) *Attorney, Agent, or Firm* — Foley & Lardner, LLP

(57) ABSTRACT

Disclosed is an internal combustion engine's piston with a piston head having first and second thinnest portions that are thinnest in thickness of the piston head. With respect to the center axis of the first and second pin holes for supporting the piston pin, the first and second thinnest portions of the piston head are respectively provided on both sides of a transverse axis that is perpendicular to the center axis of the first and second pin holes. Each of first and second rib portions that are respectively formed on inner surfaces of first and second pin boss portions extends at the piston head in a direction along the transverse axis to overlap each of the first and second thinnest portions of the piston head. This piston is capable of relaxing stress concentration at a position above the piston pin.

12 Claims, 5 Drawing Sheets

PISTON FOR INTERNAL COMBUSTION ENGINE

TECHNICAL FIELD

The present invention relates to an internal combustion engine's piston, which is applied, for example, to automotive engines, etc.

BACKGROUND OF THE INVENTION

As a conventional piston for internal combustion engines, there is known one described in Japanese Patent Application Publication 2003-269246.

This piston for internal combustion engines is designed so that the thickness of the piston head is almost uniform. That is, the piston head is designed to have a sufficient and almost uniform thickness so that the piston head is secured in rigidity.

SUMMARY OF THE INVENTION

In a piston designed to have a piston head that is almost uniform in thickness like the above conventional piston, the piston weight increase may be caused by an excessive thickness in a region except above the piston pin where a large stress is generated by the combustion pressure.

On the other hand, in a piston designed to have a piston head with a small and almost uniform thickness that is suitable for the region except above the piston pin in order to suppress the piston weight increase, stress by the combustion pressure may be concentrated at a position above the piston pin. Such stress concentration may cause deformation of the piston head.

It is therefore an object of the present invention to provide an internal combustion engine's piston that has been made in view of the technical problem of the conventional internal combustion engine's piston and that is capable of suppressing the piston weight increase and deformation of the piston head.

According to the present invention, there is provided a piston for an internal combustion engine, the piston being movable in a piston movement direction along an axial direction of a cylinder of the internal combustion engine, the piston having in the piston movement direction one side closed by a piston head and another side that is open, the piston comprising:

first and second pin boss portions that are formed on a peripheral wall on the another side of the piston, the first and second pin boss portions being opposed to each other in a diametral direction of the piston with respect to an axis of the cylinder;

first and second pin holes that are respectively formed at the first and second pin boss portions, for supporting axial end portions of a piston pin to be connected to a connecting rod; and first and second rib portions that are respectively formed on inner surfaces of the first and second pin boss portions, the first rib portion extending from a peripheral region of the first pin hole to the piston head, the second rib portion extending from a peripheral region of the second pin hole to the piston head;

wherein the piston head has first and second thinnest portions that are thinnest in thickness of the piston head, wherein, with respect to a center axis of the first and second pin holes, the first and second thinnest portions of the piston head are respectively provided on both sides of a transverse axis that is perpendicular to the center axis of the first and second pin holes, wherein each of the first and second rib portions extends at the piston head in a direction along the transverse axis to overlap each of the first and second thinnest portions of the piston head.

Advantageous Effect of the Invention

According to the present invention, the piston head is provided with the first and second thinnest portions on both sides of above the piston pin, since stress generated at the piston head by combustion pressure becomes largest at a position above the piston pin. With this, stress generated above the piston pin is dispersed towards the first and second thinnest portions, thereby relaxing stress concentration above the piston pin.

The first and second thinnest portions are provided at positions of the piston head where each rib portion overlaps them. With this, the first and second thinnest portions are supported by each rib portion. As a result, it is possible to suppress an excessive deformation of each thinnest portion.

DETAILED DESCRIPTION

In the following, an embodiment of an internal combustion engine's piston according to the present invention is described in detail with reference to the drawings. In the following embodiment, the piston is applied to an automotive engine's piston, similar to the above-mentioned conventional one.

Figure 2:
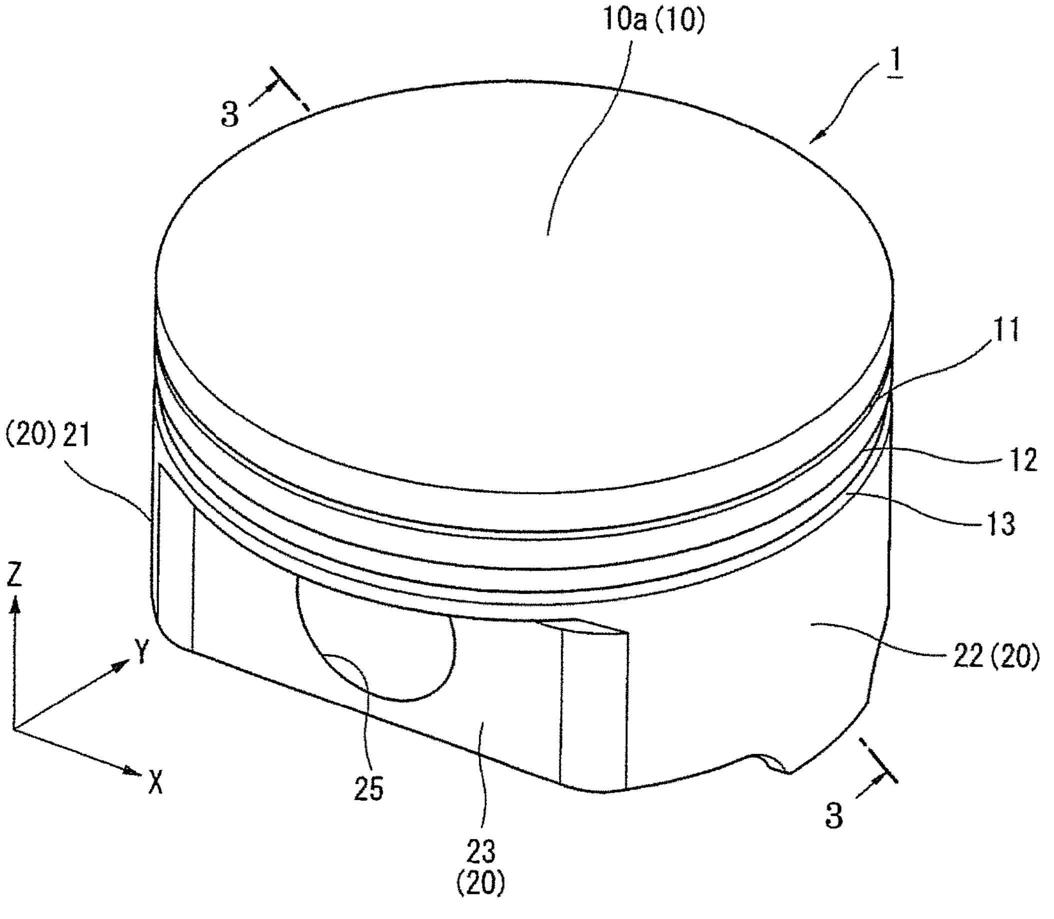
FIG. 2 is a perspective view showing the piston in FIG. 1.

In the following, as shown in FIG. 2, the piston movement direction is defined as the first axis or Z axis direction, the direction of the center axis of first and second pin holes 25, 26 is defined as the second axis or Y axis direction, and the direction perpendicular to the first axis and second axis directions is defined as the third axis or X axis direction.

Figure 1:
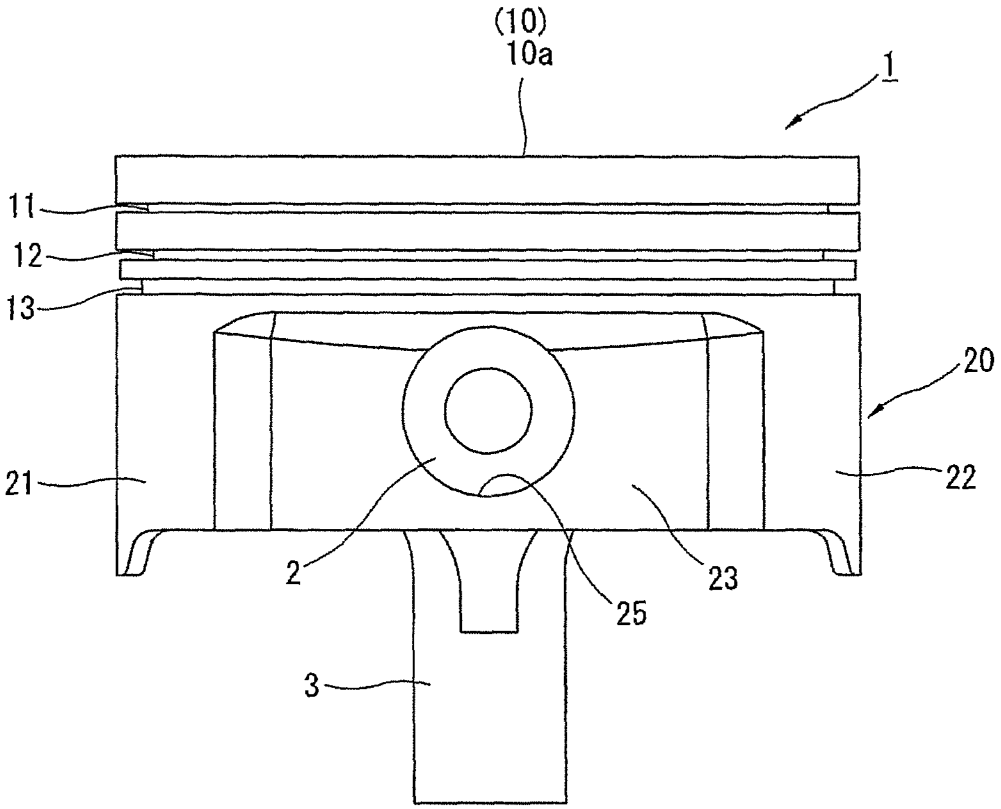
FIG. 1 is a front view showing a condition in which a piston according to the present invention is connected to a connecting rod.

As shown in FIGS. 1 and 2, this piston 1 is one made by casting, for example, an Al—Si based aluminum alloy material such as AC8A into a roofed cylindrical shape. The piston 1 is provided to be movable in an internal combustion engine's cylinder (not shown in the drawings) along the Z axis direction. The piston 1 is connected to a crankshaft (not shown in the drawings) through a connecting rod 3 connected by a piston pin 2 that passes through and is supported by the after-mentioned first and second pin holes 25, 26.

Figure 3:
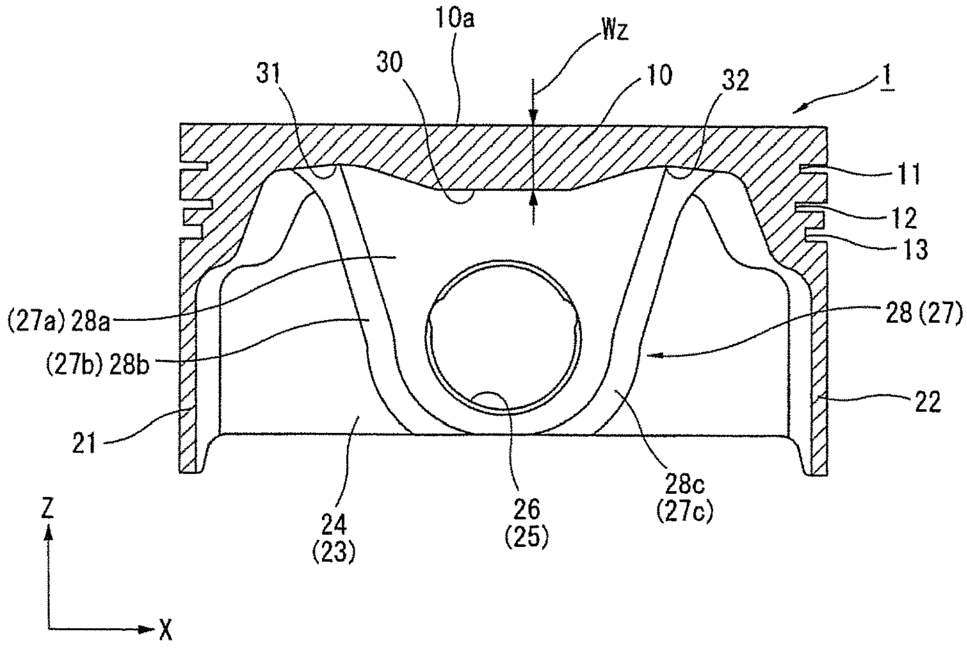
FIG. 3 is a sectional view taken along lines 3-3 in FIG. 2.
Figure 4:
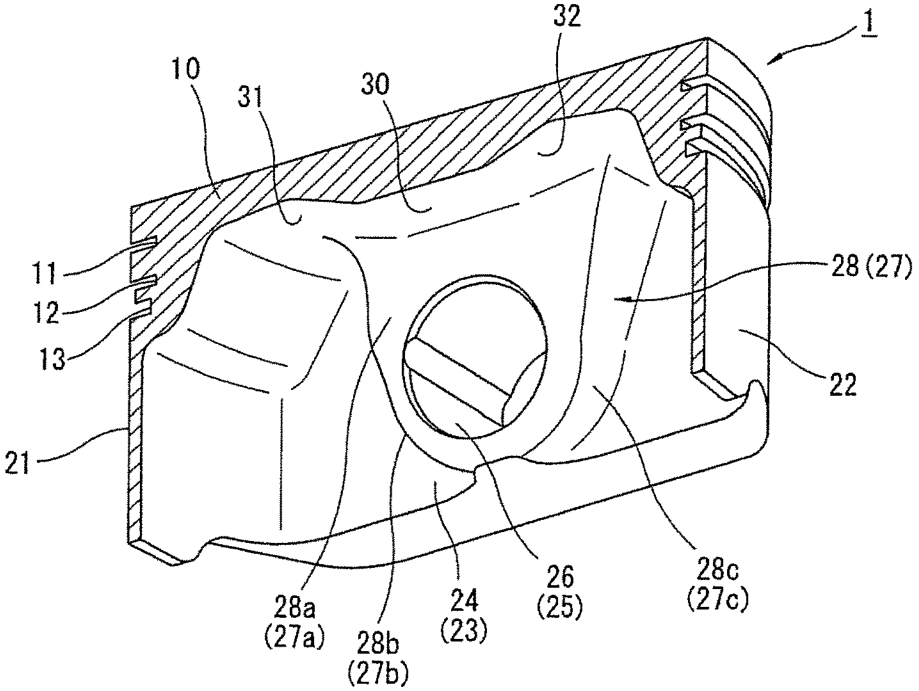
FIG. 4 is similar to FIG. 3, but showing a perspective view taken from below.

Specifically, particularly as shown in FIGS. 1-3, the piston 1 is constructed mainly of a crown portion 10 as a piston head that forms a combustion chamber (not shown in the drawings) in the cylinder by closing one side in the Z axis direction, and a tube portion 20 that is opened on the other side in the Z axis direction and serves for a connection with the connecting rod 3.

The crown portion 10 is formed at its outer surface with a crown surface 10*a* that is almost flat, and its inner surface is unevenly formed as mentioned hereinafter. This crown portion 10 is formed at its peripheral side with three annular ring grooves 11-13, each being formed as a cutout along the circumferential direction, for holding therein three piston rings (not shown in the drawings) such as pressure ring and oil ring.

The tube portion 20 has a pair of first and second skirt portions 21, 22 that are opposed to each other in the X axis direction and are to be in a sliding contact with the peripheral wall of the cylinder, and a pair of first and second pin boss portions 23, 24 that are provided as two wall portions with a certain width on both end sides of the first and second skirt portion 21, 22 to be opposed to each other in the Y axis direction, for supporting the piston pin 2. The first and second skirt portions 21, 22 and the first and second pin boss portions 23, 24 are monolithically formed into a tube shape to be continuous in the circumferential direction.

The first and second pin boss portions 23, 24 are respectively formed with first and second pin holes 25, 26 that are formed therethrough along the Y axis direction, for supporting axial end portions of the piston pin 2. That is, the first pin hole 25 receives and supports one end portion of the piston pin 2, and the second pin hole 26 receives and supports the other end portion of the piston pin 2.

Figure 5:
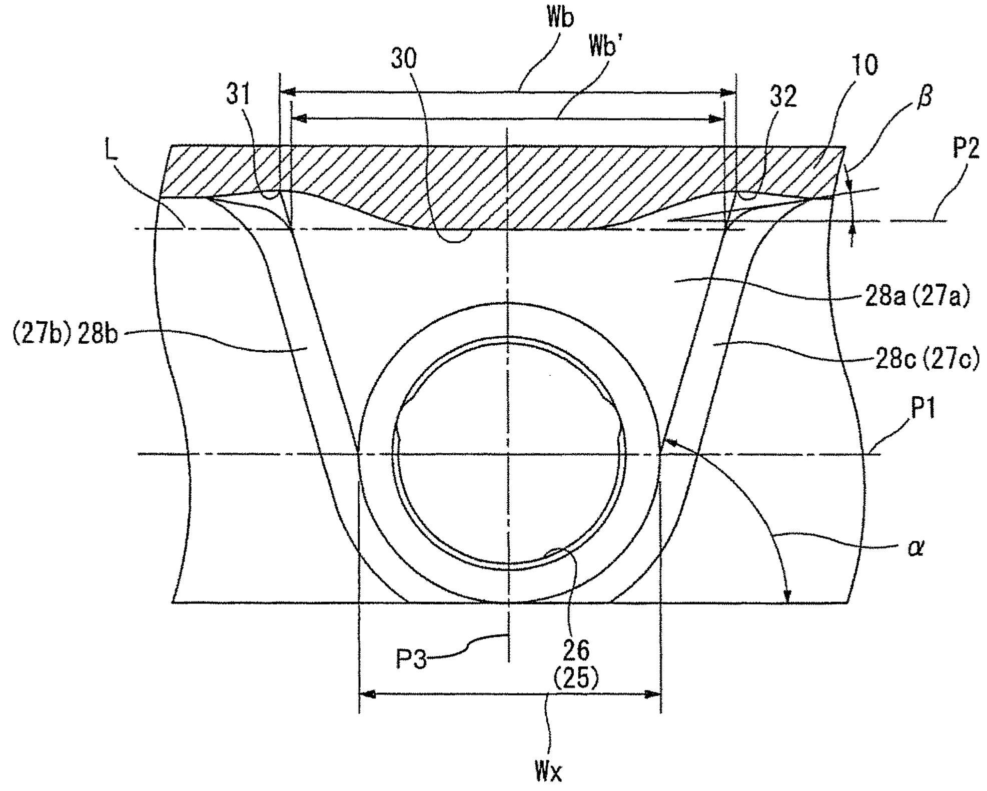
FIG. 5 is an enlarged view of FIG. 3, showing around the second rib portion.

The first and second pin boss portions 23, 24 are respectively formed at their inner surfaces with first and second rib portions 27, 28 projecting from their inner surfaces. As shown in FIG. 5, each of the first and second rib portions 27, 28 is formed, such that a width Wx of each rib portion 27, 28 in the X axis direction increases gradually from an imaginary line P1, which passes through the center of the first and second pin holes 25, 26, toward the side of the crown portion 10. This imaginary line P1 corresponds to the transverse axis that is perpendicular to the center axis of the first and second pin holes 25, 26. This center axis passes through an intersection of the imaginary line P1 and an imaginary line P3, and this intersection corresponds to the center of the first and second pin holes 25, 26. In FIGS. 3-6, only the after-mentioned characteristic structure on the side of the second pin boss portion 24 is shown, but it is needless to say that the side of the first pin boss portion 23 is also provided with the same characteristic structure.

Herein, as shown in FIG. 5, it is designed that width Wx of each rib portion 27, 28 increases gradually to have a relatively large amount of change (inclination) a in a section from the imaginary line P1 passing through the center of the first and second pin holes 25, 26 to an imaginary line P2 passing through a predetermined point before the crown portion 10 and to have a relatively small amount of change (inclination) 13 in a section from the imaginary line P2 to the crown portion 10. With this design, each rib portion 27, 28 connects smoothly with the inner surface of the crown portion 10.

The first rib portion 27 is mainly constructed of a flat center portion 27*a* that is almost constant in thickness in the Y axis direction, and left and right side portions 27*b*, 27*c* each being formed outside of the center portion 27*a* and sloped to decrease gradually from inside to outside in thickness in the Y axis direction.

Similarly, the second rib portion 28 is mainly constructed of a flat center portion 28*a* that is almost constant in thickness in the Y axis direction, and left and right side portions 28*b*, 28*c* each being formed outside of the center portion 28*a* and sloped to decrease gradually from inside to outside in thickness in the Y axis direction.

In the piston 1 according to the present embodiment, the inner surface of the crown portion is formed uneven. That is, the crown portion 10 of the piston 1 is equipped with first and second thinnest portions 31, 32, which are formed on the peripheral side of the crown portion 10 and are thinnest in thickness (i.e., width Wz in the Z axis direction in FIG. 3) of the crown portion 10, and a thickest portion 30 which is projectingly formed at a position almost at a center of the crown portion 10 between the first and second thinnest portions 31, 32 and to be thickest in thickness of the crown portion 10.

Herein, as shown in FIGS. 3 and 5, each of the first and second rib portions 27, 28 extends at the crown portion 10 in the X axis direction to overlap each of the first and second thinnest portions 31, 32 of the crown portion 10.

Furthermore, the first and second thinnest portions 31, 32 are positioned outside of the flat center portion 27*a*, 28*a* in the X axis direction. This feature is adopted in the above-mentioned exemplary embodiment in which each of the first and second rib portions 27, 28 has the flat center portion 27*a*, 28*a*. In other words, in another embodiment free from the flat center portion 27*a*, 28*a*, it is preferable that the first and second thinnest portions 31, 32 are positioned outside of the left and right side portions 28*b*, 28*c* (27*b*, 27*c*) of each rib portion in the X axis direction.

Figure 6:
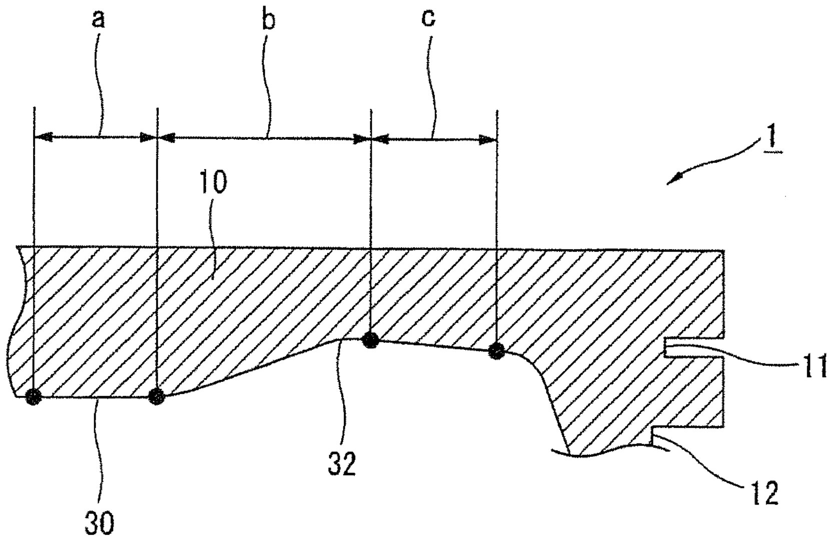
FIG. 6 is another enlarged view of FIG. 3, showing around the second thinnest portion of the piston head.

As shown in FIG. 6 in particular, the right side of the inner surface of the crown portion 10 is designed, such that a section "a" corresponding to a center portion (the thickest portion 30) in the X axis direction is formed almost flat, that a section "b" is formed to project gradually from the second thinnest portion 32 toward the center portion (the thickest portion 30) of the crown portion 10 in the X axis direction, and that a section "c" is formed to project gradually from the second thinnest portion 32 toward outside in the X axis direction. The left side of the inner surface of the crown portion 10 is designed similar to the right side, and therefore its explanation is omitted.

Figure 7:
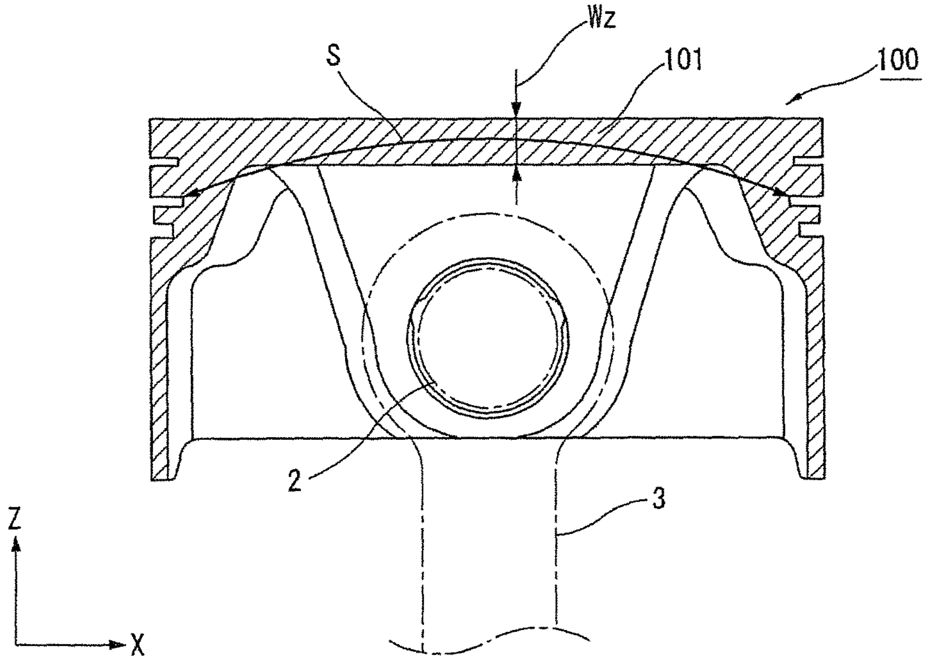
FIG. 7 (RELATED ART)
FIG. 7 is similar to FIG. 3, but showing a piston according to a related art.

With reference to FIGS. 3 and 7, operation of the internal combustion engine's piston according to the present embodiment is explained in the following.

As shown in FIG. 7, in an internal combustion engine's piston 100 according to a related art, a stress S as shown by an arrow in the drawing occurs in a crown portion 101 by combustion pressure. That is, rigidity of a center portion of the crown portion 101 above a piston pin 2 connected to a connecting rod 3 is relatively high, and a peripheral side of the crown portion 101 is subjected to flexural deformation. As a result, the stress S tends to concentrate at a position above the piston pin 2.

Thus, against this stress concentration in the piston 100, the thickness (width in the Z axis direction) Wz of the crown portion 101 is made almost uniform, based on the thickness at the center portion above the piston pin 2. This, however, causes the weight increase of the piston 100 due to an excessive thickness Wz in other regions except above the piston pin 2.

If the thickness of the crown portion 101 is set based on the above-mentioned other regions in order to avoid the weight increase of the piston, the stress S due to combustion pressure concentrates at a position above the piston pin 2, and such stress concentration may cause deformation of the crown portion 101.

In contrast, in the internal combustion engine's piston 1 according to the present embodiment, as shown in FIG. 3, the crown portion 10 is provided with the first and second thinnest portions 31, 32, which are thinnest in thickness of the piston head, respectively on one and the other sides of the crown portion 10 in the X axis direction. That is, the crown portion 10 is designed to have the thickest portion 30 having a sufficient thickness Wz at the center portion at which stress due to combustion pressure concentrates and to have the first and second thinnest portions 31, 32 on one and the other sides of the crown portion 10 in the X axis direction.

By having the first and second thinnest portions 31, 32 on one and the other sides in the X axis direction, the stress concentration at the thickest portion 30 is dispersed toward the first and second thinnest portions 31, 32, which are positioned close to the thickest portion 30 and are relatively low in rigidity.

With this, it becomes possible to reduce weight of the piston 1 by the first and second thinnest portions 31, 32. Furthermore, it becomes possible to relax stress concentration at the thickest portion 30. This also makes it possible to improve durability of the piston 1. By this relaxation of stress concentration, it becomes possible to reduce thickness Wz of the thickest portion 30 depending on the degree of the relaxation. This contributes to a further weight reduction of the piston 1.

Moreover, in the present embodiment, each of the first and second rib portions 27, 28 extends or stretches at the crown portion 10 in the X axis direction to overlap each of the first and second thinnest portions 31, 32. Therefore, the first and second thinnest portions 31, 32 are supported by each of the first and second rib portions 27, 28, thereby reinforcing the first and second thinnest portions 31, 32. With this, it is possible to remove a risk that rigidity of the first and second thinnest portions 31, 32 is lowered more than necessary. As a result, it is possible to suppress an excessive deformation of the first and second thinnest portions 31, 32 by combustion pressure.

As mentioned above, in the internal combustion engine's piston 1 according to the present embodiment, the first and second thinnest portions 31, 32 are provided on both sides of above the piston pin 2 where stress occurring in the crown portion 10 by combustion pressure becomes largest. With this, stress occurring above the piston pin 2 is dispersed toward the first and second thinnest portions 31, 32, thereby relaxing stress concentration above the piston pin 2.

Furthermore, the piston 1 is provided with the thickest portion 30 between the first and second thinnest portion 31, 32, such that the inner surface of the crown portion 10 is formed to project between the first and second thinnest portions 31, 32. Specifically, the inner surface of the crown portion 10 is formed to project gradually from each of the first and second thinnest portions 31, 32 toward the center portion of the crown portion 10 in the X axis direction. By increasing thickness (width Wz in the Z axis direction) of above the piston pin 2 where internal stress is increased by combustion pressure, rigidity of the crown portion 10 is enhanced, and durability of the piston 1 is improved.

In addition, as shown in FIG. 5, the inner surface of the crown portion 10 projects gradually from the first and second thinnest portions 31, 32 toward the center portion of the crown portion 10 in the X axis direction. Thus, a connection portion between each thinnest portion 31, 32 and each rib portion 27, 28 is moved toward the one side of the Z axis direction, that is, a side higher than an auxiliary line L in FIG. 5. With this, as shown in FIG. 5, it is possible to extend a span Wb' of the crown portion 101 of a related art (see FIG. 7), where the flat center portion of the rib portion is in contact with the crown portion, to a span Wb of the crown portion 10 of the piston 1. Therefore, it is possible to effectively suppress deformation of each thinnest portion 31, 32 by combustion pressure.

As shown in FIG. 5, the inner surface of the crown portion 10 is formed to project gradually from each thinnest portion 31, 32 toward an outside region in the X axis direction. With this, it is possible to relax stress concentration of this outside region.

Furthermore, in the present embodiment, in the X axis direction, the thickest portion 30 as a center portion of the inner surface of the crown portion 10 is formed flat. With this, it is possible to suppress change of thickness Wz at a position above the piston pin 2 where internal stress occurring in the crown portion 10 by combustion pressure becomes largest, thereby relaxing concentration of internal stress occurring at a position above the piston pin 2.

Furthermore, in the present embodiment, each rib portion 27, 28 is formed, such that width Wx in the X axis direction extends gradually from the center position of each pin hole 25, 26 toward the crown portion 10 in the Z axis direction. Thus, it is possible to have a balance between relaxation of stress concentration in each rib portion 27, 28 and suppression of the weight increase by forming a region having a high load supporting effect by combustion pressure into a tapered shape.

Furthermore, each rib portion connects smoothly to the inner surface of the crown portion 10. With this, it is possible to relax stress concentration at the connection portion between each rib portion and the crown portion 10.

Furthermore, in the present embodiment, the first and second thinnest portions 31, 32 are positioned outside of the flat center portion 27*a*, 28*a* of each rib portion 27, 28 in the X axis direction. With this, it is possible to have a large span between the first and second thinnest portions 31, 32. As a result, it is possible to relax stress concentration in each rib portion 27, 28.

It is optional that the first and second thinnest portions 31, 32 are positioned outside of the left and right side portions 28*b*, 28*c* (27*b*, 27*c*) of each rib portion in the X axis direction. With this, it is possible to have a large span between the first and second thinnest portions 31, 32. As a result, it is possible to relax stress concentration in each rib portion 27, 28.

The present invention is not limited to construction of the above-mentioned embodiment. The embodiment may be freely changed depending on the specification of an applied object, the cost, etc.

The entire contents of basic Japanese Patent Application No. 2016-137200 (filed Jul. 12, 2016) of the application, of which priority is claimed, are incorporated herein by reference.

What is claimed is:

1. A piston for an internal combustion engine, the piston being movable in a piston movement direction along an axial direction of a cylinder of the internal combustion engine, the piston having in the piston movement direction one side closed by a piston head and another side that is open, the piston comprising:

first and second pin boss portions that are formed as a peripheral wall on the another side of the piston, the first and second pin boss portions being opposed to each other in a diametral direction of the piston with respect to an axis of the cylinder;

first and second pin holes that are respectively formed at the first and second pin boss portions, for supporting axial end portions of a piston pin to be connected to a connecting rod; and first and second rib portions that are respectively formed on inner surfaces of the first and second pin boss portions, the first rib portion extending from a peripheral region of the first pin hole to the piston head, the second rib portion extending from a peripheral region of the second pin hole to the piston head;

wherein the piston head has first and second thinnest portions that are thinnest in thickness of the piston head, wherein, with respect to a center axis of the first and second pin holes, the first and second thinnest portions of the piston head are respectively provided on both sides of a transverse axis that is perpendicular to the center axis of the first and second pin holes, and wherein each of the first and second rib portions extends at the piston head in a direction along the transverse axis to overlap each of the first and second thinnest portions of the piston head.

2. The piston as claimed in claim 1, wherein the piston head has a projection portion between the first and second thinnest portions, the projection portion projecting toward the another side of the piston.

3. The piston as claimed in claim 2, wherein the first and second thinnest portions and the projection portion of the piston head are formed such that an inner surface of the piston head projects from each of the first and second thinnest portions toward a center portion of the piston head in the direction along the transverse axis.

4. The piston as claimed in claim 3, wherein the inner surface of the piston head projects from each of the first and second thinnest portions away from the center axis in the direction along the transverse axis.

5. The piston as claimed in claim 2, wherein the projection portion of the piston head has an inner surface that is substantially flat.

6. The piston as claimed in claim 2, wherein the first rib portion is formed such that a width of the first rib portion in the direction along the transverse axis increases from a center of the first pin hole towards the piston head in the piston movement direction, and wherein the second rib portion is formed such that a width of the second rib portion in the direction along the transverse axis increases from a center of the second pin hole towards the piston head in the piston movement direction.

7. The piston as claimed in claim 6, wherein each of the first and second rib portions connects to an inner surface of the piston head.

8. The piston as claimed in claim 1, wherein each of the first and second rib portions has a flat surface on an inner side in a radial direction of the piston, and the first and second thinnest portions of the piston head are positioned outside of the flat surface in the direction along the transverse axis.

9. The piston as claimed in claim 1, wherein each of the first and second rib portions has first and second side surfaces that are opposed to each other in the direction along the transverse axis and are respectively positioned on sides of the first and second thinnest portions, and wherein the first and second thinnest portions of the piston head are respectively positioned outside of the first and second side surfaces.

10. The piston as claimed in claim 1, wherein, in the direction along the transverse axis, an inner surface of the piston head has a center portion that is substantially flat.

11. The piston as claimed in claim 1, wherein the first rib portion is formed such that a width of the first rib portion in the direction along the transverse axis increases from a center of the first pin hole towards the piston head in the piston movement direction, and wherein the second rib portion is formed such that a width of the second rib portion in the direction along the transverse axis increases from a center of the second pin hole towards the piston head in the piston movement direction.

12. The piston as claimed in claim 1, wherein each of the first and second rib portions connects to an inner surface of the piston head.

* * * * *